Oct. 27, 1970  R. J. VAN OPHEM  3,536,874

DUAL BRAKING SYSTEM SAFETY DEVICE

Filed Oct. 12, 1966

INVENTOR.
REMY VAN OPHEM
BY
McNENNY, FARRINGTON, PEARNE & GORDON
ATTORNEYS

United States Patent Office 3,536,874
Patented Oct. 27, 1970

3,536,874
DUAL BRAKING SYSTEM SAFETY DEVICE
Remy J. Van Ophem, Warren, Mich., assignor to The Weatherhead Company, Cleveland, Ohio, a corporation of Ohio
Filed Oct. 12, 1966, Ser. No. 586,172
Int. Cl. H01h 35/38
U.S. Cl. 200—82                          1 Claim

ABSTRACT OF THE DISCLOSURE

A dual brake system including a switch operable to produce a signal responsive to a pressure unbalance between the two fluid lines. The switch includes a bore containing a plunger exposed to the two pressures at opposite ends. The plunger constitutes one switch element and is centered by means of a spring so that upon a pressure unbalance the plunger moves from a centered position causing a portion of the plunger to engage a second switch contact projecting into the bore to complete the electric circuit and produce the signal.

---

Figure 1:
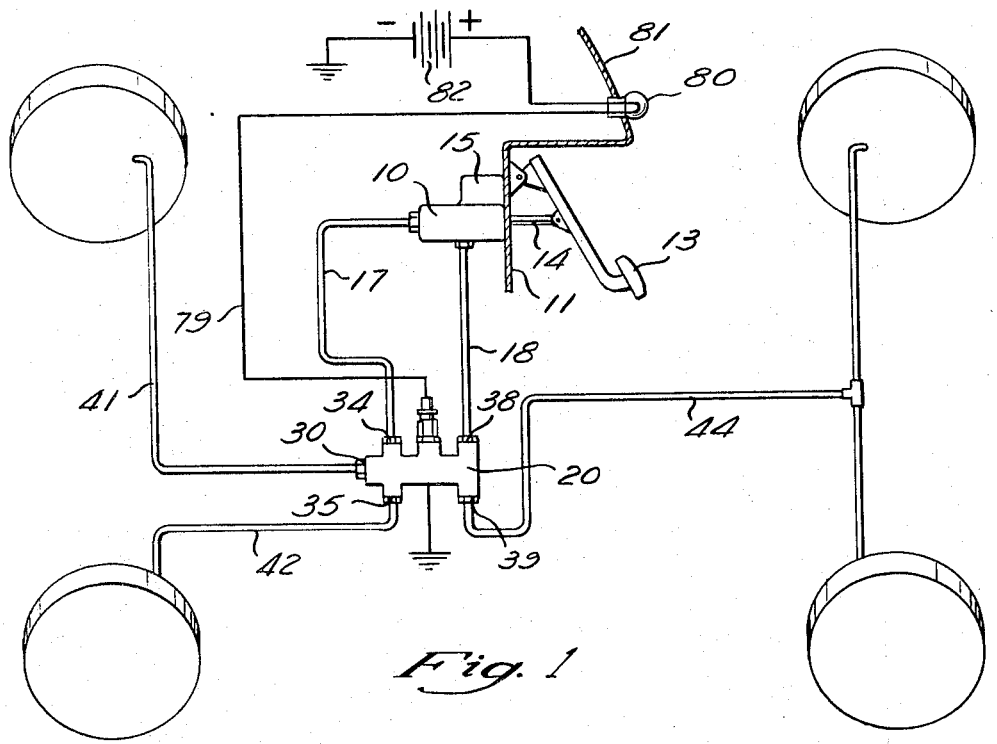

This invention relates generally to hydraulic brake systems and more specifically to pressure responsive switches for dual hydraulic brake systems for indicating a loss of pressure in either part of the system.

Dual hydraulic brake systems are used in automobiles to provide a safety factor by having two separate hydraulic circuits operated by a single brake pedal using either two separate master cylinders operated by a common linkage, or, more commonly, a single cylinder having two pistons receiving fluid from a common supply but isolated from each other upon actuation of the brake pedal and arranged in such a manner that a loss of pressure in one system does not prevent pressure build-up and operation of the other system. Thus, when this dual hydraulic system is applied to separate systems for the front and rear brakes of an automobile, a failure of one of the systems and of either the front or rear brakes leaves the other system operable for emergency purposes.

However, modern hydraulic brake systems offer such a high degree of braking power in response to foot pedal effort, particularly when the brakes are power assisted, that under low speed driving conditions, even under start and stop conditions, the rate of deceleration of the automobile is so low that the driver will not notice a failure in one of the systems since the remaining system offers sufficient stopping power for the usual amount of foot pedal effort. Thus, the incorporation of dual hydraulic brake systems in automobiles has created the necessity for incorporating a signal means which would be operable to indicate a failure in one of the hydraulic systems such as by leakage or other loss of pressure which renders that one brake system inoperable.

It has been proposed that this signal can be provided by incorporating a pressure responsive electric switch in the circuit which is operable by the fluid pressure in both systems in such a manner that it will produce a signal only if there occurs between both systems a pressure differential or unbalance exceeding a predetermined amount which cannot occur if both brake systems are operating in a normal manner. A switch for this purpose is disclosed and broadly claimed in the copending application of John A. Turchan, Ser. No. 561,128, filed June 28, 1966 now Pat. No. 3,369,090 and this invention relates to another arrangement for producing a signal in the event of a loss of pressure in one of the systems.

It is therefore a principal object of this invention to provide a switch actuator for use in a dual hydraulic brake system which is operable to produce a signal for lighting an indicating lamp in the event the pressure differential between the systems exceeds a predetermined amount and which remains actuated to maintain the lamp in a lighted condition even after the pressure differential is removed.

It is a further object of this invention to provide a switch actuator as set forth in the preceding object in which the switch contact elements are in a separate unit detachable from the actuating member.

It is a still further object of this invention to provide a switch actuator as set forth in the preceding objects in which the switch contact mechanism itself provides the necessary biasing force for holding the pressure responsive piston in the center position without the use of separate centering springs.

The principal objects and advantages of this invention are obtained in the disclosed preferred embodiment of the invention which may be briefly described as having a housing with an axial bore extending from an inlet fitting at one end to a point adjacent the other end. A piston is slidably fitted within the bore and separates the bore into two fluid chambers, one on each side of the piston, which are connected to the two separate hydraulic circuits so that upon actuation of the brakes both chambers are pressurized to the same level. This piston has a portion of reduced diameter at the center with sloping camming surfaces extending in both directions way from the center toward the sealing portions of the pistons and a transverse opening in the bore allows a plunger on a pressure switch carried on the housing to extend into the bore between the two cam surfaces. The plunger is spring loaded and serves to maintain the piston in a central position in the bore so movement in either direction causes the camming surfaces to shift the plunger radially outward to actuate the switch to indicate that the pressure unbalance has exceeded the predetermined amount. When the piston has shifted to force the plunger outward, the end of the plunger rests on a cylindrical surface and there is no restoring force on the piston which remains in this position.

The two piston portions are of slightly different diameter with the larger diameter being adjacent the open end of the bore. This allows the O-ring seals at the piston ends to be assembled by inserting the piston by one end without risking damage to the O-ring by cutting action of the transverse bore or opening through which the plunger projects. Also, since the areas are slightly different, this insures stability of operation by tending to shift the piston to a position in which the plunger rides against the cam surface on the side of the piston having the larger diameter. However, to insure balanced operation this cam surface has a steeper angle so that the same axial force is required to actuate the switch in either direction.

Further objects and advantages of this invention will readily become apparent to those skilled in the art upon a more complete understanding of the invention, the preferred embodiment of which is shown in the accompanying drawings and described in the following detailed description.

Figure 2:
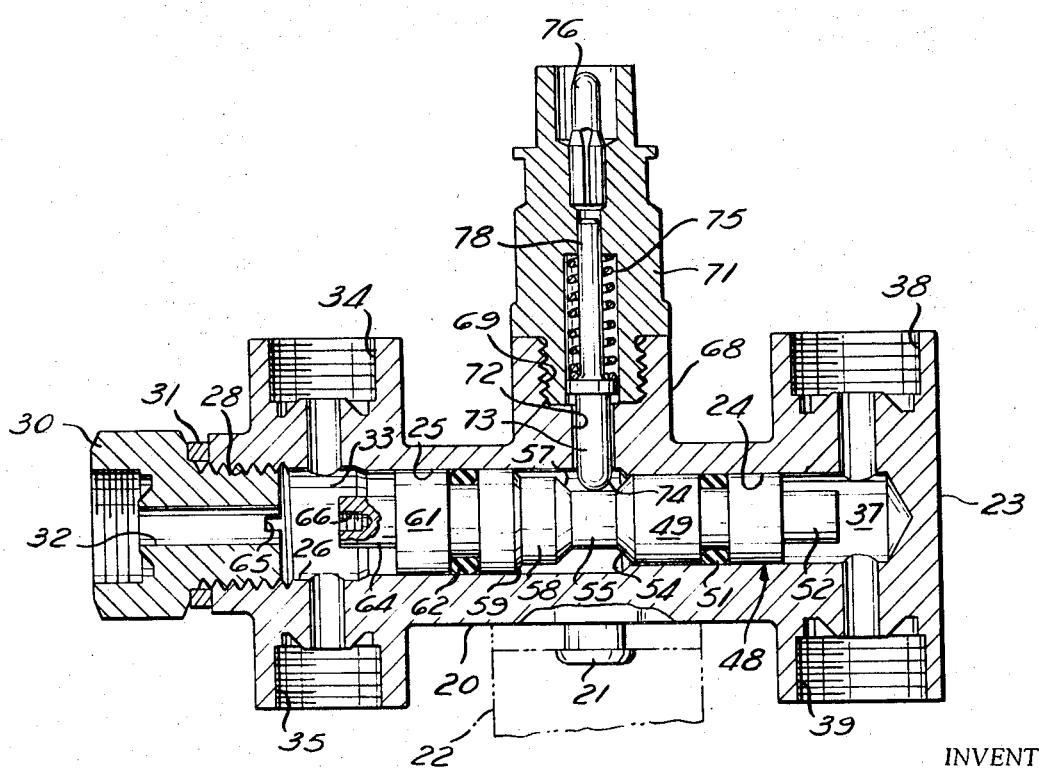

In the drawings:

FIG. 1 is a schematic view of a dual hydraulic brake system for an automobile incorporating the present invention; and FIG. 2 is an enlarged cross-sectional view of the switch unit shown in FIG. 1.

Referring now to the drawings in greater detail, FIG. 1 is a schematic showing of a braking system for an automobile in which a master cylinder 10 is mounted on a fire wall 11 within the engine compartment and a pivotally mounted foot pedal 13 acts on a piston rod 14 to produce the hydraulic pressure necessary for actuating the brakes. A reservoir 15 on top of the master cylinders supplies hydraulic fluid to the master cylinder which, being of the dual type, has two outlet lines 17 and 18 for two separate hydraulic brake circuits for the front wheels and the rear wheels, respectively.

The brake lines 17 and 18 lead to the switch unit of this invention which is shown in greater detail in FIG. 2. The switch unit has been shown as a separate unit, but it is recognized that under some circumstances it may be desirable to incorporate the switch unit into the master cylinder housing so that the lines 17 and 18 then become internal passages in the housing. The switch unit is contained in a housing 20 which may be formed with a stud 21 for mounting on a bracket 22 secured to the frame of the car for both mounting purposes and electrical grounding for completion of the electric circuit as described in greater detail hereinafter. The housing 20 has a blind bore 24 therein which terminates at its inner end in an end wall 23. The bore 24 extends toward the opposite end, or toward the left as seen in FIG. 2, where it opens into a larger bore 25 which in turn near the left end opens into a still larger counterbore 26. The counterbore 26 is provided with a threaded axial opening 28 within which is received a fitting 30 of the inverted flare type. A seal ring 31 provides a positive seal between the fitting 30 and the housing 20. The fitting also has an axial passage 32 therethrough so that the fluid can enter the counterbore 26. This counterbore 26 defines a fluid chamber 33 from which extend fitting openings 34 and 35 also of the inverted flare type.

The end of the blind bore 24 adjacent the end wall 23 forms a second fluid chamber 37 from which extend upper and lower fitting openings 38 and 39, respectively which may also be of the inverted flare type. As shown, the front master cylinder line 17 is connected to the upper fitting opening 34 while the fitting 30 and the lower fitting opening 35 are connected by individual lines 41 and 42 to the front wheel brakes. Likewise, the rear master cylinder line 18 is connected to the fitting opening 38 while the lower opening 39 serves as an outlet and is connected to the rear brakes by line 44. Thus, the one fluid chamber 33 is always at the fluid pressure transmitted to the front wheel brakes from the master cylinder by the line 17, and the other fluid chamber 37 is always at the pressure transmitted to the rear brakes by the master cylinder through the line 18.

Slidably mounted within the bores 24 and 25 to prevent fluid communication between the chambers 33 and 37 is a piston 48. The piston has a cylindrical portion 49 making a sliding fit within the bore 24 with which sealing engagement is made by means of an O-ring seal 51 carried in a groove on the cylindrical portion. An axial projection 52 extending into the chamber 37 is arranged to abut against the end wall 23 to provide a positive stop to limit movement of the piston 48 toward the end wall. At the other end, the cylindrical portion 49 extends to a conical ramp or cam surface 54 extending axially and inwardly to a reduced cylindrical neck 55. At the other end of this neck is another conical ramp or cam surface 57 facing the cam surface 54 in opposed relationship and extending to another cylindrical portion 58 having the same diameter as the cylindrical portion 49. However, because the cylindrical portion 58 is within the large bore 25, it remains spaced away from the walls thereof. Thus, the cylindrical portion 61 which is a slidable fit within the larger bore 25 with which sealing engagement is made by another O-ring seal 62. In similar manner, a cylindrical portion 61 carries a reduced diameter projection 64 to limit axial movement in the piston 48 toward the fitting 30, the inner end of which is provided with a notch 65 to permit and maintain fluid flow from the chamber 33 into the passage 32 in the event that the projection 64 should move into engagement with the inner end of the fitting. The projection 64 has a small threaded bore 66 in its end to receive a tool for shifting the piston 48 for assembly or resetting purposes.

The housing 20 is provided with a projecting boss 68 having at its outer end a threaded opening 69 into which is screwed a switch housing or body 71 preferably made of an insulating material such as nylon or the like. A bore 72 extends through the boss 68 and opens into the end of the larger bore 25 adjacent its junction with the bore 24. The switch has a sliding plunger 73 having a rounded end 74 which extends through the bore 72 into engagement with the cylindrical neck 55 on the piston 48. The plunger 73 is a loose fit in bore 72 to allow outward leakage of fluid escaping past the O-ring seals 51 and 62 to prevent hydraulic lock. Such fluid can then escape either by a separate vent or through the switch housing or body 71. The plunger 73 is biased toward the piston 48 by means of a spring 75 carried within the switch housing 71. It will be understood that although the switch arrangement including the plunger 73 has been shown, any switch having a spring biased plunger and operable to close a circuit upon outward movement of the plunger can be used and the switch contact mechanism itself otherwise forms no part of this invention.

To provide electrical contact upon movement of the plunger by engagement with either of the ramps or cam surfaces 54 and 57, the outer end of the switch housing 71 carries a hollow spring type contact member 76 which slidably receives the end 78 of plunger 73 to make electrical contact while allowing continued movement of the plunger. Thus, the switch contained within the housing 71 is constructed and arranged so that outward movement of the plunger 73 will cause it to engage the contact 76 and thereby close an electrical circuit between the contact 76 and ground which may be obtained through the switch housing 71, housing 20 and the frame of the automobile.

In order to provide a signal upon the closing of the switch contact, a wire 79 is connected from contact 76 to an indicator lamp 80 mounted on the dash board 81 of the automobile. The lamp in turn can be energized through the automobile battery or electrical system as indicated at 82 so that upon engagement of the plunger 73 with contact 76 the lamp 80 will be lighted.

When the unit is in operation, the pressures within the two fluid chambers 33 and 37 will be those created by the master cylinder 10 and while varying in magnitude depending upon how hard the brakes are applied, these pressures will always be substantially equal. Since the cylindrical portion 58 is larger in diameter and hence area than the portion 49 because of the different areas between the bores 24 and 25, equal fluid pressure will create an unbalanced force acting on the piston 48 tending to move it into the chamber 37 or toward the right as seen in FIG. 2. However, the difference in area may be, for example, only about 10 percent due to the fact that the bore 25 is made only enough larger so that when the piston is assembled into the bores, the O-ring seal 51 will not catch on the edge of the bore 72 which would tend to cut the O-ring and prevent a reliable seal. For this reason, the bore 25 is made slightly larger in diameter at the point where the bore 72 enters the passage. This differential in area being small and in view of the force required to shift the plunger 73 against the spring 75, this unbalanced force will never, even under panic stop conditions in which line pressure reaches a maximum, be so great as to cause the piston 48 to shift in position. However, this unbalance of forces generally serves to keep the piston 48 in a position where the ramp 57 rests against the rounded end 74 of the plunger 73. Thus the piston 48 tends to remain in this position at all times while the operation of the brake system is such that there are substantially equal pressures in the chambers 33 and 37.

In the event of a failure in one of the brake lines which would cause leakage and prevent the build-up of fluid pressure in one of the chambers 33 or 37, it will be seen that the full force acting on the piston is equal to the force in the one pressurized chamber times the area. This insures that even a moderate application of the brakes will create sufficient pressure in the chamber to shift the position of the piston 48. For example, if chamber 37 is the one without pressure, then the pressure in the chamber 33 will shift the piston to the right so that the cam surface 57 forces the plunger 73 radially outward against the biasing force of the spring 75 to engage the contact 76 and turn on the dash board lamp 80 indicating that there has been a loss of pressure in one of the brake lines. Under a normal brake application, this force will be sufficient to cause the rounded end 74 of plunger 73 to ride all the way up the cam surface 57 and come to rest on the cylindrical portion 58. Under these conditions, the biasing force of the spring 75 acting on the plunger 73 cannot act to restore the piston 48 to a center position, as would be the case if the plunger had moved only part way up the cam surface, and thus the piston will stay in this position and the light will remain on, even if the pressure balance were restored between the two chambers 33 and 37 by repair of the leak. The piston 48 can be reset by inserting a suitable threaded tool through the opening 28 or fitting 30 to engage the threaded bore 66 in projection 64 or by replacement or by pressurizing the chamber 37. This feature means that once there has been a brake failure, the warning lamp 80 will remain on until the brake system is repaired by a mechanic and the light will remain on even after the brake pedal 13 is released.

In the other case where it is chamber 33 in which the pressure loss occurs, then the piston 48 will be forced to the left by the pressure created in chamber 37 and the ramp of cam surface 54 will then engage the rounded plunger end 74 and move the plunger 73 outward 59 actuate the switch and turn on the dash board lamp. Again, because the cylindrical piston portion 49 is the same diameter as the cylindrical portion 58, the plunger after application of sufficient force to the piston will ride up on the cylindrical portion 49 and remain there so that the lamp remains on even when the brakes are depressurized.

Because of the differential area of the two portions 49 and 61, and because it is desirable to have the switch actuated at the same pressure differential between the two chambers 33 and 37, the left ramp of cam surface 57 is made slightly steeper than the right hand one 54 to compensate for the increased area exposed in the chamber 33. Thus, these ramps are designed so that equal pressures in the chambers 33 and 37 give equal outward forces to the plunger 73 against the biasing force of the spring 75 to insure balanced operation of the switch unit.

Although the preferred embodiment of this invention has been shown and described in detail, it is recognized that other modifications and rearrangements will readily become apparent to those skilled in the art and may be resorted to without departing from the scope of the invention as defined in the claim.

What is claimed is:

1. A switch mechanism for use in a dual fluid pressure system comprising a housing having an axial bore extending therein from one open end, a transverse passage in said housing extending into said bore, a piston slidably mounted in said bore and having a first cylindrical portion slidable in said bore on one side of said transverse passage and a second cylindrical portion slidable in said bore on the other side of said transverse passage, seal means carried on each of said cylindrical portions, a first fluid inlet to said bore on one side of said piston, a second fluid inlet to said bore on the other side of said piston, said piston having a portion of reduced diameter intermediate said first and second cylindrical portions, first and second conical cam surfaces outward of said reduced portion and tapering radially and axially outwardly toward said first and second cylindrical portions, stop means at each end of said piston for limiting the axial shifting movement of said piston in said bore, switch means mounted on said housing and having a plunger extending through said transverse passage into said bore adjacent said reduced piston portion, spring means biasing said plunger into contact with said reduced piston portion intermediate said conical cam surface, so that an excessive pressure differential between said first and second fluid inlets tends to shift said piston toward the lower pressure inlet against the adjacent stop means whereby the adjacent cam surface forces said plunger radially outward in said transverse passage to actuate said switch, said plunger being disengaged from said adjacent cam surface and said plunger engaging a cylindrical portion of said piston intermediate said adjacent cam surface and one of said seals upon said shifting of said piston against said adjacent stop means, said spring and said plunger providing the sole biasing means to hold said piston in a center position with said plunger adjacent said reduced diameter portion intermediate said cam surfaces, and said sole biasing means being inoperative to return said piston from its shifted position against said adjacent stop means to said center position when said excessive pressure differential between said first and second fluid inlets is diminished.

References Cited
UNITED STATES PATENTS 3,394,401   7/1968   Roberts _____ 200—82

HAROLD BROOME, Primary Examiner

Dedication 3,536,874.—*Remy J. Van Ophem*, Warren, Mich. DUAL BRAKING SYSTEM SAFETY DEVICE. Patent dated Oct. 27, 1970. Dedication filed July 31, 1972, by the assignee, *The Weatherhead Company*.
Hereby dedicates said entire patent to the Public.
[*Official Gazette February 19, 1974.*]